T. B. ATTERBURY & W. BECK.
Machine for Shaping and Finishing Glassware.
No. 8,677. Reissued April 15, 1879.
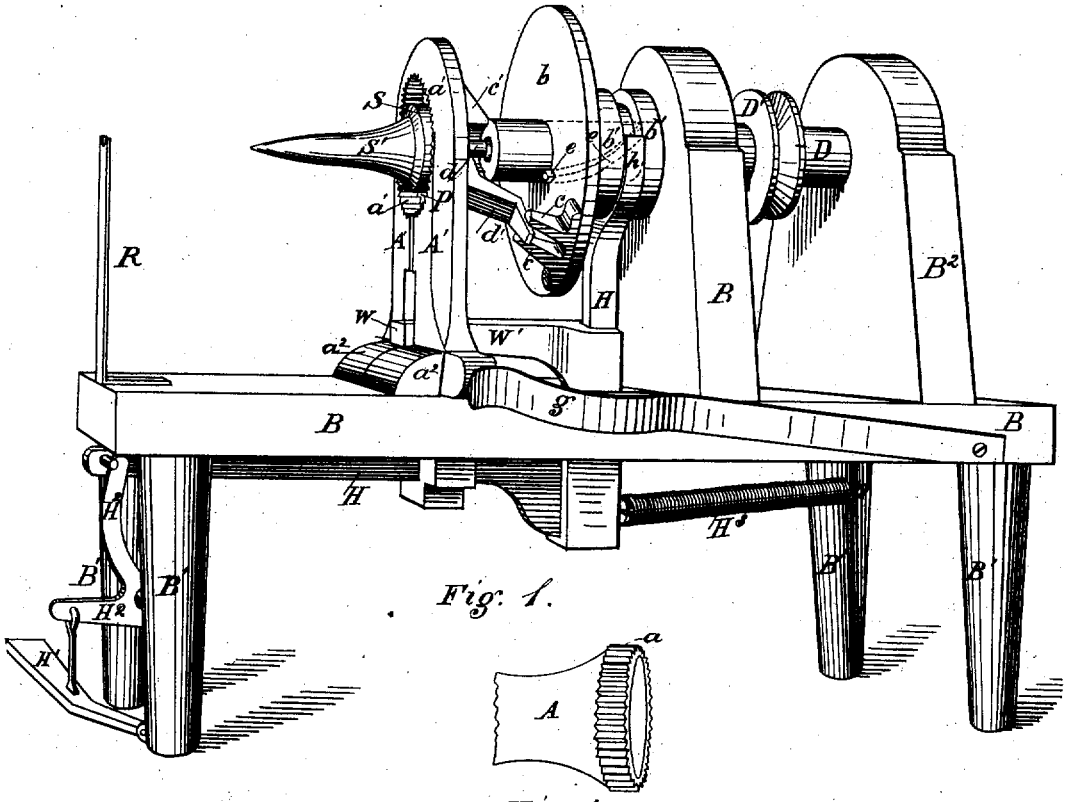
Fig. 1.
Fig. 4.
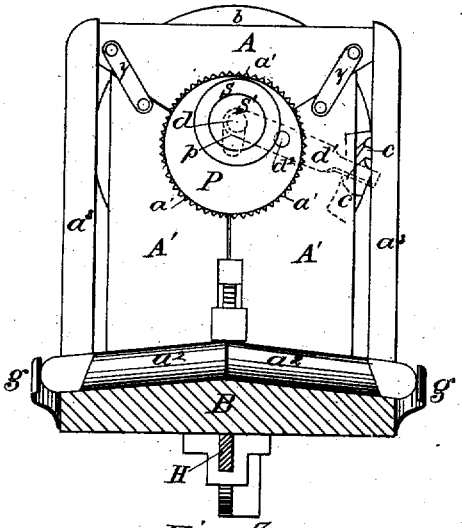
Fig. 3.
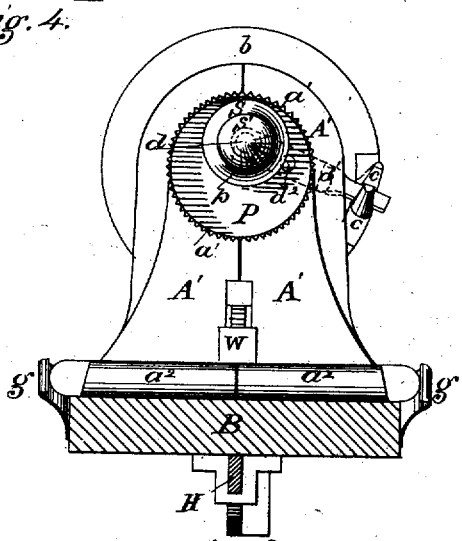
Fig. 2.
Witnesses
C. L. Parker
R. H. Whittlesey
Inventors Thomas B. Atterbury,
Washington Beck
By Attorney George H. Christy
N. PETERS, PHOTO-LITHOGRAPHER, WASHINGTON, D. C.

UNITED STATES PATENT OFFICE.

THOMAS B. ATTERBURY AND WASHINGTON BECK, OF PITTSBURG, PA.

IMPROVEMENT IN MACHINES FOR SHAPING AND FINISHING GLASSWARE.

Specification forming part of Letters Patent No. 212,421, dated February 18, 1879; Reissue No. 8,677, dated April 15, 1879; application filed March 24, 1879.

*To all whom it may concern:*

Be it known that we, THOMAS B. ATTERBURY and WASHINGTON BECK, both of Pittsburg, county of Allegheny, State of Pennsylvania, have invented or discovered a new and useful Improvement in Machines for Shaping and Finishing Open-Ended Tubular Glassware; and we do hereby declare the following to be a full, clear, concise, and exact description of the invention, reference being had to the accompanying drawings, making a part of this specification, in which—like letters indicating like parts—

Figure 1 is a perspective view of a machine illustrative of our improvement. Fig. 2 is an end elevation thereof. Fig. 3 shows a three-part molding-frame, the use of which will presently be explained; and Fig. 4 illustrates the kind of work the machine is particularly designed to do.

In Fig. 4 we have shown the upper end, A, of a lamp-chimney having an ornamental band, *a*.

Our improvement is particularly designed for the making of this ornamentation, or rather for the making of a ring or band of ornamental work of any desired design, either raised or depressed, or partly raised and partly depressed, around the open top ends of glass lamp-chimneys, or around the open tubular ends of other hollow glassware, wherever the same may be desired; and we do this by working the glass, while sufficiently hot to retain the necessary degree of plasticity, between the interior face of an annulus or ring having the design or ornamentation (in reverse) which it is desired to give to the glass band and the exterior periphery of an interior traversing former, which has a double motion—one around the inside of the article opposite the interiorly-ornamented annulus or ring, and the other toward and from such ring, whereby the plastic glass is worked into or against the ornamental face of the annulus or ring, and by taking the imprint thereof gets the ornamentation or design transferred thereto in the ring or band form specified. It is also designed in part for shaping and finishing the inner surface of open-ended tubular articles of glassware, which is effected by the use of a single interior shaping or finishing tool, so mounted in the machine and mechanically driven as to have simultaneously a revolving motion on or around a fixed axis, and also a radial motion (straight or curved) to and from the fixed axial line of the revolving motion.

The table or stand B is of any desired construction, supported on legs $B^1$, and having plumber-blocks $B^2$, for carrying the main driving-shaft D, and also any desired number and arrangement of rests R. Motion is imparted to the shaft D by means of a band-wheel, D′, or in other suitable way. On the shaft D is mounted a disk-wheel, *b*, the hub *b′* of which is grooved, and a fork, *h*, of a sliding frame, H, affords means for shifting the disk-wheel forward or back. This frame H extends below the table, and is moved one way by any suitable treadle, $H^1$, and lever $H^2$, and in the opposite direction by a spring, $H^3$, though other means for effecting such motions may be employed.

On the forward end of the shaft D we attach a face-plate, P, by an interposed conical-shaped connection, *c′*, cut away on one side, as shown in Fig. 1. This face-plate has a slot (indicated by dotted lines *p* in Figs. 2 and 3) extending from at or near its center radially in a straight line, or, if necessary, in a slight curve, the desired distance toward the edge of the face-plate. A pin, *d*, passes through this slot and back of the face-plate. Such pin is fastened to the inner end of a lever, $d^1$. Outside the face-plate we attach to the forward end of the pin the interior traversing former *s* and a shaping and finishing tool, *s′*. The latter has the function of shaping and finishing the inside of the upper end of the chimney A, below the band *a*, which it does in the manner well known in the art, and for this purpose it may have any desired form or construction. Surrounding the former *s*, and in the same plane, is the ornamented annulus or ring *a′*, having on its inside face (in reverse) the design or ornamentation which it is desired to give to the band *a* on the glass article. The one half of this ring $a^1$ is made in each of two movable frames or jaws, A′, each sliding in ways $a^2$ on the table B, so that they may be closed together to form the exterior ring, or be separated in order the more easily to remove the finished article.

In order to close them together we employ springs $g$, the ends of which bear against the lower ends of the frame A′, and to open them we introduce between them a wedge, $w$, broad at its forward end and tapering back to a narrow neck. This wedge is made on the end of an arm, $w'$, which extends forward from the sliding frame H.

The lever $d^1$ is fulcrumed to the rear of the face-plate at or about the point $d^2$, Fig. 2, and its outer end is bent, so as to be engaged by a pair of lugs, $c$ $c$, affixed to the adjacent face of the disk-wheel $b$, and these lugs are of such length that they will engage the lever throughout the entire motion of the disk-wheel along lengthwise of the driving-shaft.

The normal relative position of the devices when not in use is that shown in Fig. 1—that is to say, with the two parts of the frame A′ slightly separated, and the traversing former $s$ concentric with the face-plate P. The heated end of the lamp-chimney or other article is then passed over the shaping and finishing tool $s'$ and former $s$, and pressed against the face-plate, which, of course, revolves with the main shaft, and operates as a shaping and finishing tool to shape and finish the extreme end. The two halves of the frame A′ are closed together by causing the wedge $w$ to advance, leaving the spring $g$ free to act. At the same time the finishing or shaping tool $s'$ and traversing former $s$ are to be shifted or moved radially outward, so as gradually to enlarge, shape, and finish the upper end of the chimney, and particularly to work its extreme end between the periphery of $s$ and the ornamented interior of $a^1$. To accomplish this the lever $d^1$ must turn on its pivot $d^2$, so as gradually to move the pin $d$ along the slot $p$, and thereby cause $s$ to approach $a^1$, as shown in Fig. 2. For this purpose either of two equivalent means may be used, both of which are shown in the drawings.

The disk-wheel $b$ may be connected with the shaft D by a spiral feather and groove, $e$, or the lugs $c$ $c$ may be made with an incline or at an angle to the face of the disk, as shown; or, if so preferred, both means may be employed together. The same motion in the sliding frame H which permits the closing together of the two parts of the frame A′ also causes the disk-wheel $b$ to advance on the shaft.

If the spiral feather and groove $e$ be employed, the disk will have both a forward and a rotary motion, and its rotary motion, acting on the lever $d^1$ through the lugs $c$ $c$, will cause the lever $d^1$ to turn on its fulcrum $d^2$ and move the traversing former $s$ outwardly toward the ring $a^1$. The same result will follow if the lugs $c$ $c$ are made inclined, since they will shift the lever by the amount of their inclination upon the forward motion of the disk $b$. In this way the former $s$ is caused to work against the inside of the extreme end of the glass article and work it outward against the design on the inside of $a^1$, and also work or press it into such design and cause the imprint of the latter thereon, and so give the band $a$ in the finished product.

The rotary motion of the disk and shaft will, through the lever $d^1$ and face-plate P, be imparted to the former $s$, so that the latter, going around eccentric to the face-plate, will traverse the entire inside of the end of the glass article, with the result described.

Shifting the sliding frame back will reopen the two parts of the frame A′ and bring the former $s$ and tool $s'$ back to the center, so as to leave the glass article clear.

The disk-wheel $b$ is, in effect, a rotating lever or crank, and an arm projecting from the hub $b'$ and carrying a pair of lugs, $c$ $c$, would suffice for all the functions required.

A crimping-tool may be added, if so desired, so as to crimp the end of the chimney outside of the band $a$. Such tool, if used, should be arranged back of the former $s$ and in front of the face-plate P, and be loosely mounted, so as to remain non-rotating while the crimping is being done.

The design to be imprinted on the glass may be made on the periphery of the traversing roller, if so preferred. In case the design is of such nature or form that the article cannot be readily removed from a two-part ring, $a^1$, then such device may be made in three or more parts. We have shown in Fig. 3 a frame or jaws, A′ A′ A′, and annulus or ring $a^1$ $a^1$ $a^1$, made in three parts, and the parts connected by outwardly-inclined, diverging, or diagonal links $y$ $y$ in such way that the outward horizontal motion of the lower parts, A A′, will, acting through such links, raise the upper or third part, and thus all three parts will be carried away from the inclosed article; also, the lower part or parts, A, may have a descending as well as a horizontal motion by sliding on inclined ways $a^2$ $a^2$, so that the under side of the ring $a^1$ may clear the design made on the article.

The lateral or sidewise motion of the lower parts, A′ A′, in opening and closing may be given by wedge $w$ and springs $g$ $g$, as before described; and upright guides $a^3$ $a^3$ may also be used, which, with the lateral ways $a^2$, constitute a frame, within which the parts A′ A′ A′ move.

Instead, however, of making all of the parts of the ring $a^1$ movable, two of them may be moved up and away from the finished article, when the article may be raised and removed from the remaining parts, and in such case it will suffice to make a little over one-half of the whole ring movable; and in imparting the requisite motions to this movable part or parts of the ring other connections may be substituted for the diverging links $y$ $y$, and vertical or upward motion may be given to one or more parts by an incline or wedge face on the upper surface of the wedge $w$, which may bear directly against the adjacent parts A′ A′ or indirectly by some interposed connection with some other part, and thus give it vertical motion; and such modifications we consider as coming within our invention.

We claim herein as our invention—

1. The method of making an ornamental band around the end of tubular articles of glassware by causing an interior traversing former, operating eccentrically to its driving-shaft, to work the metal or material outwardly against a surrounding annulus or ring, substantially as set forth.

2. The method of shaping and finishing the interior surface of open-ended tubular glassware by causing a tool, while moving progressively away from the fixed center on or around which it revolves, to traverse the interior surface to be operated on, substantially as set forth.

3. A single interior revolving shaping and finishing tool, $s'$, of any desired form or construction, arranged to move to and from the fixed center on or around which it revolves in the operation of shaping and finishing the interior surface of open-ended tubular articles of glassware, substantially as set forth.

4. The combination of an interior shaping and finishing tool, $s'$, a slotted guide for directing its motion to and from a fixed center of rotation, and mechanical means for effecting simultaneously its radial and revolving motions, substantially as described.

5. In a glass-finishing machine, the combination of a traversing former, $s$, and a surrounding ring, $a^1$, one or the other having an ornamentation or design in or on its operative face, substantially as set forth.

6. The two, three, or more part frame A′, forming, when closed, an annulus or ring, $a^1$, and a traversing former, $s$, in combination with suitable means for closing together the parts of the frame and moving the former radially outward toward the face of the ring, substantially as described.

7. A lever, $d^1$, fulcrumed to the face-plate, carrying at one end a traversing former, $s$, in combination with a rotary crank-arm and means for causing the crank-arm to operate the lever without interfering with their connection and simultaneous rotation, substantially as and for the purposes set forth.

8. The combination of tool $s'$, traversing former $s$, and ring $a^1$, substantially as set forth.

9. The sliding frame H, carrying wedge $w$ and fork $h$, in combination with two or more part frame A′ and cranked hub $b'$, substantially as set forth.

In testimony whereof we have hereunto set our hands.

THOS. B. ATTERBURY.
WASHINGTON BECK.

Witnesses:
R. H. WHITTLESEY,
C. L. PARKER.